Aug. 4, 1942.    G. A. CHAUSSON    2,291,607
COOLING DEVICE FOR ENGINES
Filed Dec. 15, 1939    3 Sheets-Sheet 3
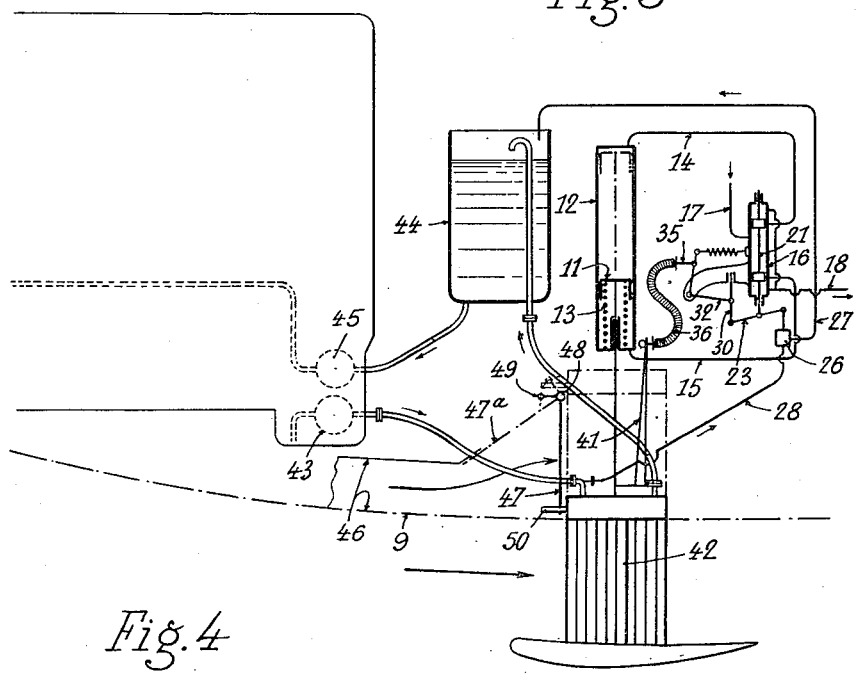
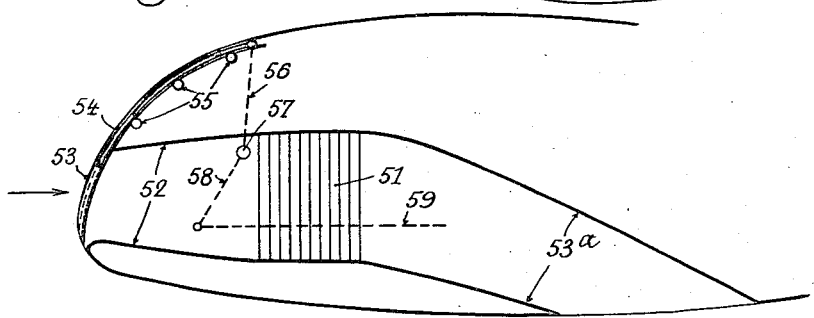
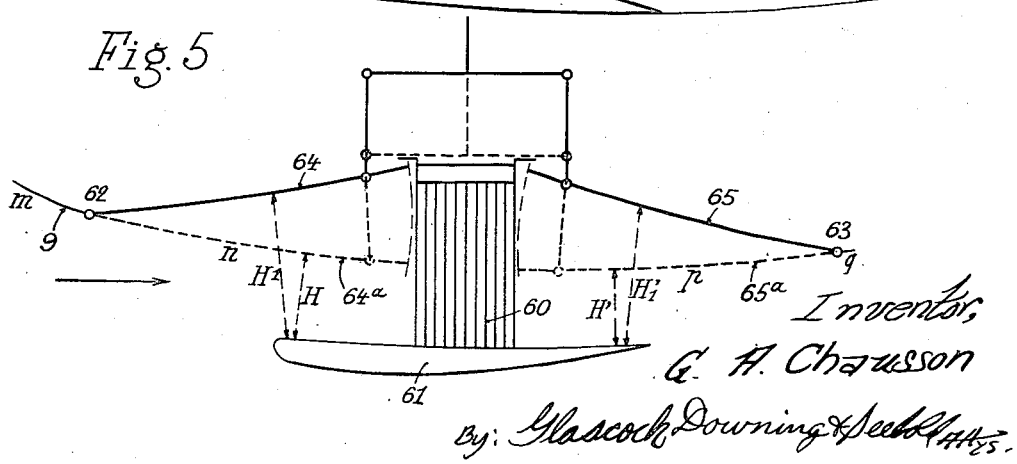
Inventor:
G. A. Chausson
By: Glascock Downing & Seebold Attys.

Patented Aug. 4, 1942

2,291,607

UNITED STATES PATENT OFFICE 2,291,607

COOLING DEVICE FOR ENGINES

Gaston Auguste Chausson, Paris, France, assignor to Societe Anonyme des Usines Chausson, Asnieres, Seine, France, a French company Application December 15, 1939, Serial No. 309,506
In France December 24, 1938

15 Claims. (Cl. 123—174)

The known methods for regulating the temperature of fluids employed for cooling engines of the explosion or the internal combustion type, and in general, all engines actuating a land, water or aerial vehicle, do not permit of regulating, correlatively and automatically, the cooling and the energy required for this latter.

In fact, the construction of temperature-regulating devices such as the thermostatic valves used for the circulations of water or oil, or the heat-regulating flaps or shutters mounted on the air circuit, will not modify, or will modify in the unfavourable sense, the energy expended for cooling the radiators.

Moreover, the known thermostatic devices cannot possess, at the same time, a small calorific inertia, an appreciable displacement and a considerable force.

The present invention has for its object an improved cooling device for engines of the explosion, internal combustion or other types, used for vehicles or for like purposes, which is chiefly distinguished by the fact that it comprises a temperature regulator with servo-motor, which permits, according to the temperature and in an automatic manner, the regulation of the supply of air (or other fluid) required for the cooling, and this in such manner that the energy expended for the cooling will vary, for a given rate of the relative displacement of the radiator or radiators and of the air, in accordance with this supply of air, i. e., with the useful effect of the cooling.

In the case of a vehicle, in particular, it may be advantageous to adopt either of the following solutions:

The (or each) radiator may be movable and can be displaced, according to an increase of the temperature, from the interior to the exterior of a fuselage or body, and inversely.

The radiator may have the fixed position relatively to a fuselage or body, and may be combined with flaps for the admission of air, under automatic control, which may conform to the shape of the said fuselage or body and will supply the air to the radiator in such manner that any reduction of the air supply will correspond to an improvement of the hull shape i. e., to a reduction of the energy expended by the displacement of such hull.

The regulator with servo-motor thus employed, essentially comprises a detector consisting of an apparatus having a small calorific inertia, adapted to produce a displacement or a force, even though small, by the effect of a variation of the temperature or of the viscosity of the fluid (such as a two-metal strip, a thermostat, or a valve affected by the viscosity); a distributor adapted to supply to the servo-motor a fluid under pressure (water, fluid, air) and which may be the fluid whose temperature is to be regulated, or an auxiliary fluid; a servo-motor comprising for instance a cylinder and piston, with a reaction spring which serves to bring back the said piston to a given position when the engine is stopped; and a controlling device adapted to connect, in a continuous manner, the displacement of the servo-motor piston with the displacement of the detector, in such way that each position of the detector will correspond to a well-defined position of the said piston.

According to another important feature of the regulator with servo-motor, the controlling device comprises, between the servo-motor and the distributer, a non-rigid transmission for distant operation, for instance by a cable contained in a flexible casing, etc., which permits, according to the requirements of the general size, of locating, when necessary the servo-motor and the distributor which is directly connected with the detector, in two respective places which are either far apart or cannot be directly connected together by a rigid transmission.

In the accompanying drawings, which are given solely by way of example:

Fig. 3 is a view, analogous to Fig. 1, relating to the case of an oil radiator.

Figs. 4 and 5 are analogous views of two modifications.

Figure 1:
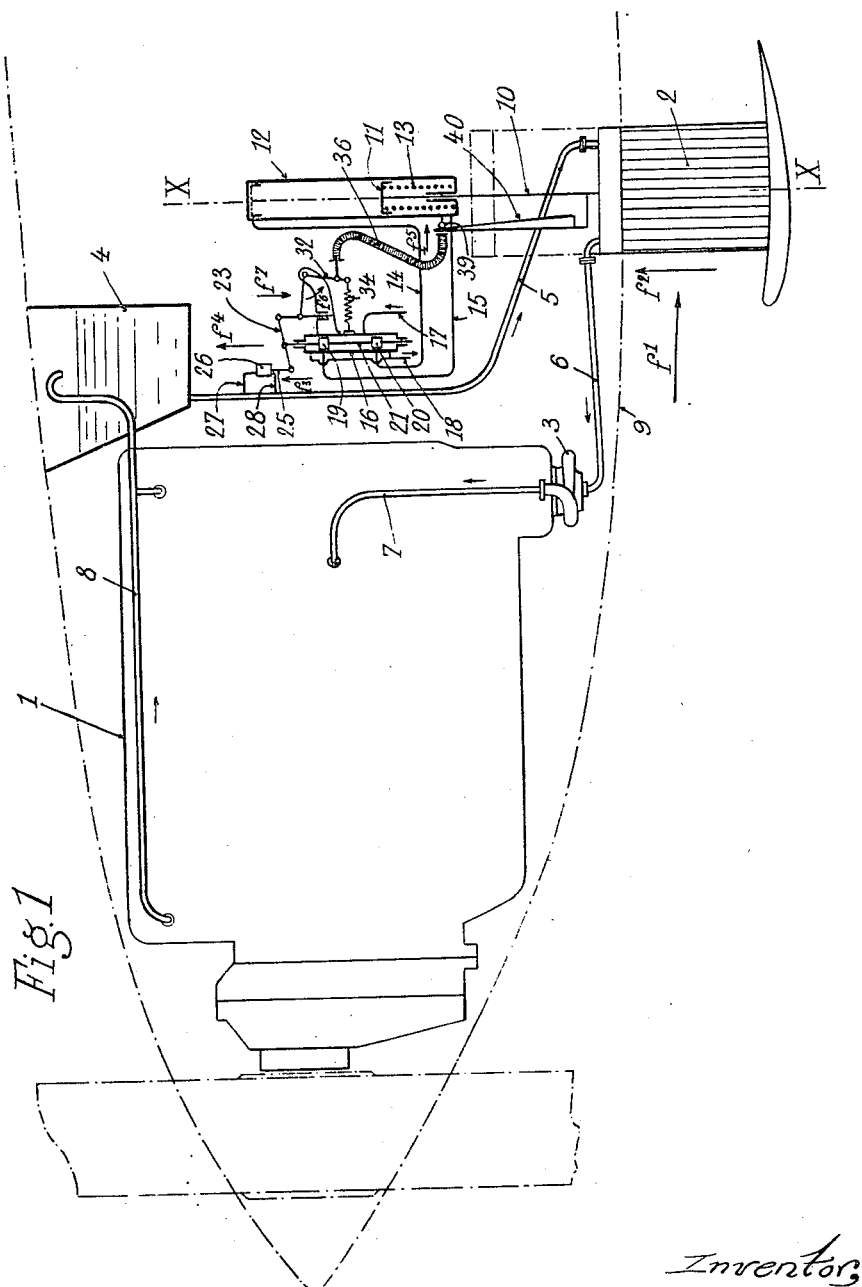
Fig. 1 is a diagrammatic elevational view of a cooling device for aeroplane engines, improved according to the invention.
Figure 2:
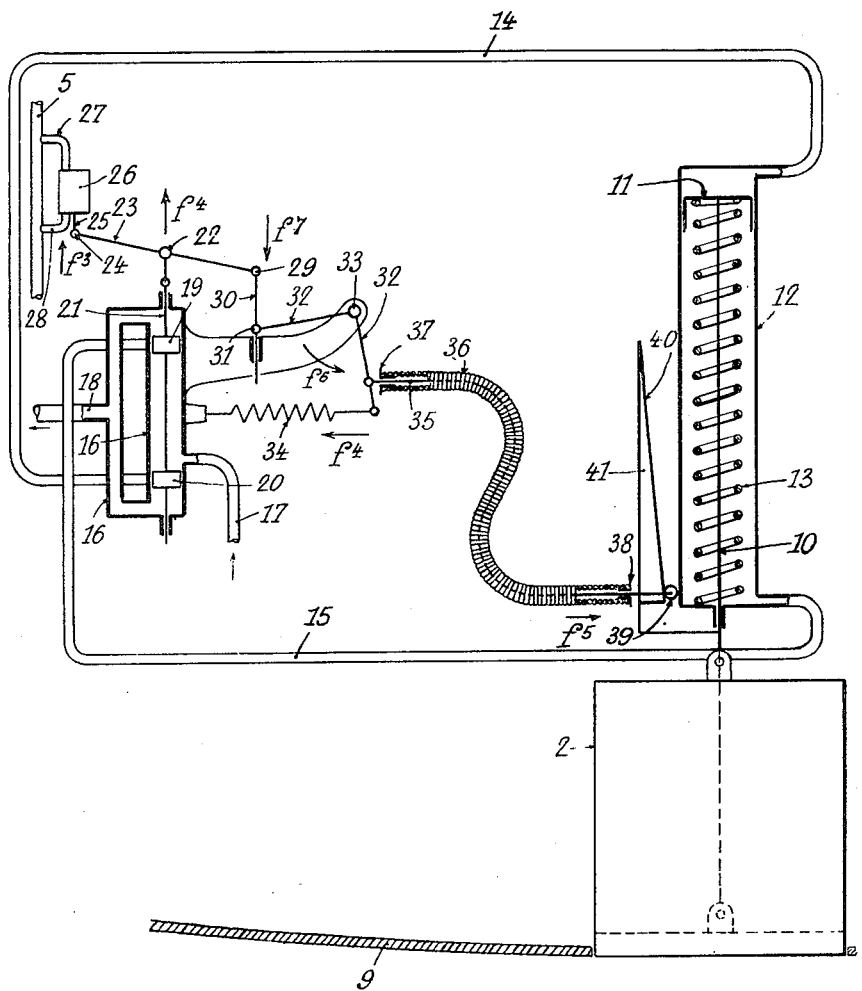
Fig. 2 is a general view, on a larger scale.

In the embodiment shown in Figs. 1 and 2, the aeroplane engine 1 is cooled by the circulation of water between this engine and a radiator 2 by the action of a pump 3 which withdraws the hot water from an upper tank 4 through a pipe 5, through the radiator 2 and a pipe 6, and delivers it to the said tank 4 through a pipe 7, the engine 1 and a pipe 8.

The said radiator is movable on the axis XX, that is, at right-angles to the wall 9 of the engine housing, and it can assume all positions between a position in which it entirely disappears within the housing 9 (Fig. 2), and the position shown in Fig. 1 in which it is entirely outside, thus offering to the surrounding cold air which strikes it according to the arrow $f^1$, its maximum surface of exchange. This surface diminishes, when the radiator is displaced in the direction of the arrow $f^2$, from the position shown in Fig. 1 to the withdrawn position shown in Fig. 2, and the same is evidently true for the cooling action upon the circulating water.

The said radiator 2, which is properly guided, is connected by a rod 10 with the piston 11 of a servo-motor. The cylinder 12 of this servo-motor has the fixed position, and a spring 13, which surrounds the rod 10 between the piston and the corresponding end of the cylinder, counterbalances the weight of the radiator 2. The two ends of the cylinder 12 are connected by respective pipes 14 and 15 with the cylinder 16 of a distributor connected with a pipe 17 supplying a compressed actuating fluid which may for instance be the fluid (water or the like) whose temperature is to be regulated, or an auxiliary fluid. Both ends of the cylinder 16 are connected with a discharge pipe 18. The cylinder 16 contains two movable slide-valves 19 and 20 which are connected together by a rod 21 and are spaced apart by such distance that when one valve (20 for instance) places the pipe 14 on the discharge, the other valve (19) connects the pipe 15 with the admission, and inversely, and in the mean position of the pistons, as herein represented, all connection is cut off between the pipes 14 and 15, and the pipes 17 and 18. The rod 21 connecting the two pistons is pivotally mounted at 22, outside of the cylinder 16 on a lever 23. The said lever 23 is pivoted at one end, at 24, to the rod 25 of a thermostatic detector 26 which is connected in parallel, by conduits 27 and 28, with the pipe 5 in which is circulated the hot water flowing to the radiator 2. The said detector is so arranged that the rod 25 will move in the direction of the arrow $f^3$ when the temperature falls in the pipe 5. The other end of the lever 23 is pivoted at 29 to a rod 30 which is slidable, in the direction parallel to the rods 21 and 25, in the main frame. To this rod 30 is pivoted, at 31, one arm of a bell-crank lever 32, which is pivoted to the main frame at 33. To the other arm of this lever 32, which is urged in the direction of the arrow $f^4$ by a spring 34, is attached one end of a cable 35 contained in a Bowden casing 36. The said casing 36 is held between two fixed stops 37 and 38. The other end of said cable 35 extends out of the casing 36 and carries a roller 39 which bears, by the action of a spring 34, upon the inclined face 40 of a cam-shaped member 41 which is mounted on the rod 10 of the piston and thus participates in the movements of the radiator 2.

The operation is as follows:

It will be supposed, to give a concrete example, that the radiator is in the entirely free position as shown in Fig. 1. In these conditions, if the engine speed should be reduced, the temperature in the pipe 5 will diminish, and it will thus be necessary to raise the radiator 2 in order that it will project to a less degree beneath the housing 9. Owing to a reduction of the temperature of this water, the detector 26 will act in the direction $f^3$ upon the end 24 of the lever 23. During this movement, the point 29 may be considered as stationary, and hence the point 22, or the joint of the distributor rod 21, will move in the direction $f^4$. The slide-valve 19, 20 will also move in the direction $f^4$, and thus the valve 19 will make connection between the pipe 17 supplying fluid under pressure, and the pipe 15 connected with the lower end of the servo-motor cylinder 12, while the valve 20 will connect the pipe 14 leading to the upper end of the cylinder 12 with the discharge pipe 18.

By the effect of this movement of the slide-valves, the piston 11 will rise, while the spring 13 will be less compressed, thus drawing in the radiator 2 to a certain extent. At the same time, the piston will displace the cam 41 having a rectilinear and oblique part 40, which is secured to the piston. The displacement of this cam will effect the displacement of the cable 35 in the direction of the arrow $f^5$. In this manner, by the action of the lever 32 which turns in the direction of the arrow $f^6$ against the spring 34, the pivot point 29 of the lever 23 will move in the direction $f^7$. As the detector has a definite position depending upon the temperature of the water, the point 24 now has a fixed position, and the lever 23 will turn about this point, thus moving the point 22 in the contrary direction to $f^4$, i. e., placing the slide-valve in such position as to cut off the various conduits. The whole device will thus remain in position for the time being. In this case, if the temperature should rise in the pipe 5, the mechanism will operate in the contrary direction, and the radiator 2 will be moved out to a certain degree.

In this way, the radiator will take at each instant, between the two extreme positions shown in Figs. 1 and 2, a mean position which depends upon the engine speed and the surrounding temperature.

As will be observed, the cable 35 contained in the flexible casing 36 will cause the displacement of the radiator 2 to depend upon the displacement of the detector, and thus the radiator can be maintained in a position of equilibrium which is clearly defined and depends upon the supply of air required for the evacuation of the heat of the engine for a given temperature of the water.

Since the energy expended in the cooling corresponds to the effect of the portion of the radiator exposed at the outside of the fuselage, and since the supply of air used for the evacuation of the heat will depend upon the portion of the radiator outside of the fuselage, this will afford an effective regulation of the expended energy according to the temperature.

Fig. 3 shows an application of the servo-motor regulator to the regulation of the temperature of the oil used in the engine. In this construction, the oil radiator 42 is supplied by the pump 43 which delivers through this radiator into the tank 44 from which the oil is withdrawn by the pump 45, the radiator being located at the lower part of the fuselage 9, and it can be moved in or out of this latter, under the control of the servo-motor.

The servo-motor is arranged as in the preceding embodiment, in combination with the distributer 16 and the detector 26. Moreover, the lower part of the fuselage contains a conduit 46 which brings to a point next the radiator 42 in its inner or withdrawn position, a supply of air which is heated in any suitable manner, for instance by circulating it around the engine, around the silencer (muffler), or otherwise. This conduit 46 is normally closed by a flap or shutter 47 pivoting on a fixed axle 48 and adapted to descend by its own weight. The said flap 47 is provided with a lateral lug 49 which makes contact with a tappet 50 mounted on the radiator 42 when this latter is in its raised position, and thus the said flap 47 will be lifted to the position 47a.

If it be supposed that the radiator 42 is in its lower position owing to the rise of the temperature of the oil, if this temperature should now diminish, the radiator will rise into the fuselage. During a portion of its upward movement, the radiator parts will take a position in the rear of the flap which is now lowered. Only during the latter part of the movement, will this flap be entirely raised to the position 47a, thus allowing a flow of hot air which is sent upon the radiator parts.

The said device will thus allow of withdrawing the radiator to the greatest possible degree in order to reduce its effect of resistance to the air, and then of heating the oil to a degree which is indispensable for the proper operating of the engine and for the safety of the different working parts, but only below a certain temperature of the oil.

It is evident that various changes may be made in the two systems above described. For instance, the transmission of the temperature of the fluid to the detector can be effected in any other suitable manner, such as by mounting the detector in the main circuit of the radiator on the upstream side of the radiator, or by utilizing the displacement of a device such as a manometric diaphragm or a piston controlled from a distance by a thermostat which is properly mounted on the source of heat, or by the effect of expansion of a liquid, a gas or a vapour. On the other hand, the reaction spring 13 may be placed at the outside of the servo-motor and may act at any point of the transmission of movement from the servomotor to the radiator. The action of said spring may even be such that when the engine is stopped or if the pressure of the fluid used in the servo-motor should cease, the radiator will be in the lower position.

Figs. 4 and 5 represent two modifications in which the automatic regulation of the expended energy is effected with relation to the temperature, the radiator being in a fixed position on the body or fuselage. The variation of the supply of air required for the cooling will now be due to the displacement of flaps by the action of the servo-motor, which displacement corresponds to a variation of the outline of the fuselage or body, i. e., to a variation of their head resistance due to the speed of the vehicle.

In the embodiment shown in Fig. 4, the radiator 51 (for water or oil) is mounted in the fixed position in the interior of an aeroplane wing or cell. It is supplied with air by a conduit 52 which opens in a region of pressure at the leading edge 53, and the hot air is discharged by another conduit 53a whose rear end is situated in a region of vacuum on the under side. A flap 54 is mounted at the inlet of the conduit 52, which flap 54 has a form corresponding to the outline of the hull 53 which is normally extended upon the conduit 52. The said flap is guided by rollers 55 or otherwise, and is connected, for instance by arms 56, with a pivot axle 57, and is rotated by a lever 58 connected with the rod 59 of the servo-motor.

According to the temperature of the fluid (water or oil) circulating in the radiator 51, the servo-motor will bring the flap 54 more or less towards the inlet of the conduit 52. It will be noted that the variation of the resulting supply of air corresponds to a variation, in the same direction, of the energy expended for the cooling, by reason of the correlative increase of the effective area of the orifice.

In the modification shown in Fig. 5, the radiator 60 is mounted fixedly beneath a fuselage 9 in such way that its effective middle plane will be wholly or partially in the interior of the fuselage indicated by the line $mnpq$ in elevation. The lower part of the radiator is streamlined at 61, and the flow of air thus obtained for the cooling is marked out by the heights H at the intake and H' at the exit of the air. In the case of this modification, the portion of the radiator exposed to the action of the air with the height H will be, for instance, sufficient to afford the minimum possible cooling when in operation. Certain parts of the fuselage 64 and 65 are pivotally mounted on respective axles 62 and 63, and thus they can be raised, as represented, so that the entire middle plane of the radiator will be exposed to the action of the air. At this time, the intakes and offtakes of the air are $H_1$ and $H'_1$ respectively. The movable parts 64 and 65 are connected, by a suitable control, with the servomotor provided with a temperature regulator. This will afford, by the variation of the air-flow sections according to the temperature, a regulation of the cooling and also of the energy expended, which latter is a minimum for the lowered positions 64a and 65a of the flaps, corresponding to the optimum outline of the hull.

Obviously, the invention is not limited to the embodiments herein described and represented, which are given solely by way of example. These various forms of construction can be combined together, if necessary. It is evident that the invention is applicable to the case of stationary plants, in which the circulation of the cooling air is effected by any suitable mechanical means, for which the necessary power will be, according to the invention, proportional at all times to the desired cooling effect.

The said invention further relates, in its various uses, to the servo-motor with distributer which can be connected at a distance by flexible devices or by any other means whether hydraulic, electric or the like, such apparatus being considered per se.

Having now described my invention what I claim as new and desire to secure by Letters Patent is:

1. A cooling device for a radiator comprising in combination a heat responsive element, means for circulating through said heat responsive element the liquid to be cooled in said radiator, a source of fluid under pressure, a fluid actuated servo-motor, a distributor connected with said source of fluid under pressure and adapted to supply fluid under pressure to said servo-motor, means adapted to displace relatively to each other said radiator and a cooling medium surrounding said radiator, means actuated by said servo-motor and adapted to vary the quantity of cooling medium encountering said radiator, controlling means connected with said heat responsive element and adapted to actuate said distributor according to the temperature of the liquid to be cooled in said heat responsive element, and means operated by said servo-motor and adapted to actuate said distributer in a direction opposite to that imparted by said heat responsive element.

2. A cooling device for a radiator mounted in a movable streamline casing comprising a heat responsive element, means for circulating through said heat responsive element the liquid to be cooled in said radiator, a source of fluid under pressure, a fluid actuated servo-motor, a distributer connected with said source of fluid under pressure and adapted to supply fluid under pressure to said servo-motor, means actuated by said servo-motor and adapted to bring said radiator out of and into said streamline casing, controlling means connected with said heat responsive element and adapted to actuate said distributer according to the temperature of the liquid to be cooled in said heat responsive element, and means operated by said servo-motor and adapted to actuate said distributer in a direction opposite to that imparted by said heat responsive element.

3. A cooling device for a radiator mounted in a movable streamline casing comprising an open-ended passage provided through said casing and extending from front to rear in the direction of normal movement of said casing and adapted to contain said radiator, flap means adapted to assume different positions between one extreme position in which said flap means forms a part of the streamline casing and covers completely said passage and another extreme position in which said flap means uncovers at least partially said passage, a heat responsive element, means for circulating through said heat responsive element the liquid to be cooled in said radiator, a source of fluid under pressure, a fluid actuated servo-motor, a distributer connected with said source of fluid under pressure and adapted to supply fluid under pressure to said servo-motor, means actuated by said servo-motor and adapted to bring said flap means in any position between its extreme positions, controlling means connected with said heat responsive element and adapted to actuate said distributer according to the temperature of the liquid to be cooled in said heat responsive element, and means operated by said servo-motor and adapted to actuate said distributer in a direction opposite to that imparted by said heat responsive element.

4. A cooling device for a radiator mounted in a movable streamline casing comprising a passage in said casing opening on one side of said casing and adapted to contain at least partially said radiator, flap means surrounding said passage and adapted to assume different positions between one extreme outer position in which said flap means forms a part of the streamline casing and covers at least partially said radiator and another inner extreme position in which said flap means uncovers completely said radiator, a heat responsive element, means for circulating through said heat responsive element the liquid to be cooled in said radiator, a source of fluid under pressure, a fluid actuated servo-motor, a distributer connected with said source of fluid under pressure and adapted to supply fluid under pressure to said servo-motor, means actuated by said servo-motor and adapted to bring said flap means in any position between its extreme positions, controlling means connected with said heat responsive element and adapted to actuate said distributer according to the temperature of the liquid to be cooled in said heat responsive element, and means operated by said servo-motor and adapted to actuate said distributer in a direction opposite to that imparted by said heat responsive element.

5. A cooling device according to claim 1, in which non-rigid connecting means are included in said means operated by said servo-motor and adapted to actuate said distributer.

6. A cooling device according to claim 1, in which said means operated by said servo-motor and adapted to actuate said distributer comprises lever means connected with said distributer, a cam member operated by said servo-motor, a follower adapted to be displaced by said cam member, and a flexible cable connecting said follower and said lever means.

7. A cooling device according to claim 2 further comprising a source of hot gaseous fluid, a conduit in said casing having its exit end on one side of said radiator when this latter is situated in its retracted position in said casing and adapted to bring said hot gaseous fluid over said radiator, a shutter adapted to take a position in which said conduit is intercepted and another position in which said conduit is open, and means actuated by said radiator and adapted to bring said shutter in its open position when said radiator is in its retracted position in said casing.

8. A cooling device for a radiator comprising in combination a container adapted to contain said radiator, driving means adapted to bring said radiator and said container out of and into each other so as to expose variable areas of said radiator to the medium surrounding said container, a heat responsive element, means for circulating through said heat responsive element the liquid to be cooled in said radiator, and controlling means connected with said heat responsive element and adapted to actuate said driving means and to move said radiator and container relatively to each other according to the temperature of the liquid to be cooled in said heat responsive element.

9. A cooling device for a radiator comprising in combination a container adapted to contain said radiator, a source of fluid under pressure, a fluid actuated servo-motor adapted to bring said radiator and said container out of and into each other so as to expose variable areas of said radiator to the medium surrounding said container, a distributer connected with said source of fluid under pressure and adapted to supply fluid under pressure to said servo-motor, a heat responsive element, means for circulating through said heat responsive element the liquid to be cooled in said radiator, and controlling means connected with said heat responsive element and adapted to actuate said distributer and said servo-motor so as to move said radiator and container relatively to each other according to the temperature of the liquid to be cooled in said heat responsive element.

10. A cooling device for a radiator mounted in a movable streamline casing comprising a source of fluid under pressure, a fluid actuated servo-motor adapted to bring said radiator out of and into said streamline casing so as to expose variable areas of said radiator to the medium surrounding said container, a distributer connected with said source of fluid under pressure and adapted to supply fluid under pressure to said servo-motor, a heat responsive element, means for circulating through said heat responsive element the liquid to be cooled in said radiator, and controlling means connected with said heat responsive element and adapted to actuate said distributer and said servo-motor so as to move said radiator relatively to said casing according to the temperature of the liquid to be cooled in said heat responsive element.

11. A cooling device for a radiator mounted in a movable streamline casing comprising an open-ended passage provided in said casing and extending from front to rear in the direction of normal movement of said casing and adapted to contain said radiator, flap means adapted to assume different positions between one extreme position in which said flap means forms a part of the streamline casing and covers completely said passage and another extreme position in which said flap means uncovers at least partially said passage, a source of fluid under pressure, a fluid actuated servo-motor adapted to bring said flap means in any position between its extreme positions so as to expose variable areas of said radiator to the medium surrounding said container, a distributer connected with said source of fluid under pressure and adapted to supply fluid under pressure to said servo-motor, a heat responsive element, means for circulating through said heat responsive element the liquid to be cooled in said radiator, and controlling means connected with said heat responsive element and adapted to actuate said distributer and said servo-motor so as to move said flap means relatively to said radiator according to the temperature of the liquid to be cooled in said heat responsive element.

12. A cooling device according to claim 9 in which said controlling means comprise a pivot, a lever adapted to oscillate on said pivot and connected with said heat responsive element and with said distributer, whereby said heat responsive element is adapted to bring said distributer from its inoperative position into an operative position, and means actuated by said servo-motor and connected with said pivot and adapted to bring said distributer back into its inoperative position.

13. A cooling device according to claim 9 in which said controlling means comprise a pivot, a lever adapted to oscillate on said pivot and connected with said heat responsive element and with said distributer, whereby said heat responsive element is adapted to bring said distributer from its inoperative position into an operative position, a cam member operated by said servo-motor, a follower adapted to be displaced by said cam member, and connecting means between said follower and said pivot, whereby said cam member is adapted to bring said distributer back into its inoperative position.

14. A cooling device according to claim 9 in which said controlling means comprise a pivot, a lever adapted to oscillate on said pivot and connected with said heat responsive element and with said distributer, whereby said heat responsive element is adapted to bring said distributer from its inoperative position into an operative position, a cam member operated by said servo-motor, a follower adapted to be displaced by said cam member, and connecting means including flexible elements between said follower and said pivot, whereby said cam member is adapted to bring said distributer back into its inoperative position.

15. A cooling device according to claim 9, further comprising a source of hot gaseous fluid, a conduit in said container having its exit end on one side of said radiator when this latter is situated in said container and adapted to bring said hot gaseous fluid over said radiator, a shutter adapted to take a position in which said conduit is intercepted and another position in which said conduit is open, and means actuated by said servo-motor and adapted to bring said shutter in its open position when said radiator is situated in said container.

GASTON AUGUSTE CHAUSSON,